Patented Dec. 15, 1931

1,836,155

UNITED STATES PATENT OFFICE

ALFRED DAVIDSON, OF BLACKLEY, MANCHESTER, ENGLAND, ASSIGNOR TO IMPERIAL CHEMICAL INDUSTRIES LIMITED, OF LONDON, ENGLAND

PRODUCTION OF GREEN SHADES ON MATERIALS MADE OF OR CONTAINING CELLULOSE ESTERS OR ETHERS

No Drawing. Application filed May 23, 1929, Serial No. 365,576, and in Great Britain June 9, 1928.

For the dyeing of cellulose esters or ethers in green shades of a fastness suitable to modern demands, it is usually necessary to employ a mixture of dyes, and it is very desirable that a process should be discovered which avoids the drawbacks attendant upon the employment of two or more dyes in the dyebath (as, for example, unequal avidity, uneven dyeing, and unequal exhaustion).

I have now found that beautiful green shades may be obtained by the use of the compound, presumably N,N'-dimethylindigo, first described by Ettinger and Friedländer in Berichte der Deutsche Chemischegesellschaft, 1912, vol. 45, pages 2074–2076. I find that this compound may be applied directly in aqueous suspension in the presence or absence of dispersing agents, protective colloids and the like. It may be prepared in finely divided paste form and the paste may be dried in the presence of suitable protective colloids to give a powder which yields a dispersion when added to water.

One method of applying my invention is illustrated by the following example, in which the parts are by weight.

Example

For 100 parts of acetate silk, a dyebath is prepared containing 10 parts of a 10% paste of N,N'-dimethylindigo and 2 parts of Turkey red oil in 3000 parts of water. The material is entered at about 40° C. and dyed at 40–50° C. for one hour, after which it is rinsed and dried. A bright green shade results.

What I claim and desire to secure by Letters Patent is:—

1. The process for the production of green shades on cellulose esters or ethers by applying thereto in a dyebath N,N'-dimethylindigo.

2. Cellulose esters or ethers dyed green shades and which contain incorporated therewith N,N'-dimethylindigo.

3. In the manufacture of dyed cellulose esters and ethers having green shades, the process which comprises applying an aqueous suspension of N,N'-dimethylindigo to such cellulose esters and ethers and thus directly dyeing such cellulose esters and ethers in green shades.

4. In the manufacture of dyed acetate silk have a bright green shade substantially fast to washing and soaping, the process which comprises applying to acetate silk an aqueous suspension of N,N-dimethylindigo, said suspension containing turkey red oil, and thus directly dyeing said acetate silk in bright green shades.

5. As a new product dyed cellulose esters and ethers having bright green shades, said dyed cellulose esters and ethers being dyed directly by N,N'-dimethylindigo.

6. As a new product, dyed acetate silk having a bright green shade substantially fast to washing and soaping, said dyed acetate silk being dyed directly by N,N'-dimethylindigo.

7. In the manufacture of dyed acetate silk having bright green shades, the process which comprises immersing said acetate silk in a dye bath comprising an aqueous suspension of N,N'-dimethylindigo, said aqueous suspension containing turkey red oil and said dye bath being maintained at a temperature between 40–50° C., keeping the acetate silk in said bath until the dye is fixed on the acetate silk, and then removing the dyed acetate silk from the bath, rinsing and drying thus directly dyeing the acetate silk in bright green shades.

In testimony whereof I affix my signature.

ALFRED DAVIDSON.